United States Patent [19]
Dahlén et al.

[11] Patent Number: 6,076,639
[45] Date of Patent: Jun. 20, 2000

[54] MECHANICALLY ADJUSTABLE WEAR INDICATOR

[75] Inventors: Tord Dahlén, Eskilstuna; Bengt Vilén, Sala; Thomas Andersson, Eskilstuna, all of Sweden

[73] Assignee: Volvo Wheel Loaders AB, Eskilstuna, Sweden

[21] Appl. No.: 09/011,656

[22] PCT Filed: Mar. 13, 1997

[86] PCT No.: PCT/SE97/00428

§ 371 Date: Feb. 13, 1998

§ 102(e) Date: Feb. 13, 1998

[87] PCT Pub. No.: WO97/47896

PCT Pub. Date: Dec. 18, 1997

[30] Foreign Application Priority Data

Jun. 13, 1996 [SE] Sweden ................................. 9602343

[51] Int. Cl.[7] .................................................. F16D 66/00
[52] U.S. Cl. ............................. 188/1.11 R; 188/1.11 W
[58] Field of Search ........................ 188/1.11 R, 1.11 W; 116/208, 216; 192/30 W

[56] References Cited

U.S. PATENT DOCUMENTS 3,533,491 10/1970 Svenson .
4,186,822 2/1980 Khuntia et al. ................... 188/1.11 W
4,356,897 11/1982 Urban ................................ 188/1.11 W
4,658,936 4/1987 Moseley ........................... 188/1.11 W
5,035,303 7/1991 Sullivan ........................... 188/1.11 W
5,186,284 2/1993 Lamela et al. .................... 188/1.11 W
5,228,541 7/1993 Plude ................................ 188/1.11 W
5,697,472 12/1997 Walker et al. .................... 188/1.11 W

FOREIGN PATENT DOCUMENTS 2.206.821 6/1974 France .
27 05 179 8/1977 Germany ......................... 188/1.11 W
2 005 769 4/1979 United Kingdom .

*Primary Examiner*—Robert J. Oberleitner
*Assistant Examiner*—Thomas J. Williams
*Attorney, Agent, or Firm*—Young & Thompson

[57] ABSTRACT

The invention relates to a wear indicator (11) for a vehicle brake, for example. The indicator has an adjustable measuring rod (12) which can be inserted into a cavity (14) in a brake housing (2), so that one end abuts against the brake piston (4) and the other end protrudes from the brake housing. When the brake is engaged, the length of the measuring rod (12) can be calibrated by means of a calibrating cap (27, 30) to a predetermined starting value corresponding to new friction linings.

10 Claims, 2 Drawing Sheets

MECHANICALLY ADJUSTABLE WEAR INDICATOR

BACKGROUND OF THE INVENTION

The invention relates to a war indicator for friction linings for vehicle brakes.

A tractor or motorized excavation machinery, for example, an agricultural tractor, a loader, a dumper of an excavator, is often used off road and thus dirt and mud, water or snow can cover the wheels and form thick coatings on the wheels covering the wheel hubs. The law and security considerations dictate that all motor vehicles and in particular heavy vehicles must have well functioning brakes. It is therefore important, despite the heavy coating of dirt on the wheel hubs, to be able to check the wear situation for each friction lining in the vehicle without having to disassemble the brakes or drive to the shop for checking.

Wear indicator based on electrical, electronical or mechanical principles are previously known but are unreliable, and the first two mentioned tend not to function at all under the hard operating conditions described above. Another disadvantage is that the driver is first alerted when the friction lining in question is almost completely worn down, for example by an electrical circuit being broken. In principle, the lining is then worn down to a maximum permissible thickness determined by the manufacturer, which means that the vehicle should no longer be driven until new linings have been installed.

A conventional mechanical method of measuring brake wear is by measuring, through a cavity in the flange of the axle casing and in the brake piston, with a special tool against the countersurfaces and discs of the brake, and comparing these measurements to calculate the thickness of the lining. Since vehicles of this type usually have oil-cooled brakes, the cavity in the axle casing must be replugged after each measurement and transmission oil runs out through the cavity during the measuring process.

Another method of conventional type is making a radial opening in the hub retainer directly in front of the peripheral edge of the brake disc. For the same reasons as discussed above, the opening is normally replugged. The distance between the countersurface and the brake piston in a portion located outside the peripheral edge of the brake disc is measured with a type of feeler gauge, which is inserted through the radial opening. An additional disadvantage of this method is that the radial opening in some vehicles is covered by the wheel rim, which means that the wheel must be taken off prior to each measurement.

A further developed mechanical variant has an easily displaceable rod built into the brake, with the aid of which it is possible to measure the position of the brake piston relative to the brake housing when the brake is engaged. Conventionally, this pin has a fixed length which is a disadvantage as it means that the measured distance varies depending on the tolerances of the components affecting the length of the protruding pin. Such components can be the brake housing, the piston, the discs, the stationary discs and the counter surface. The two previously described methods also have this disadvantage.

SUMMARY OF THE INVENTION

An advantage with the wear indicator according to the invention is, however, that it is possible to check, whenever desired, directly at the construction site, the degree of wear of each lining in a reliable manner, by virtue of the fact that an adjustable measuring rod is arranged at each wheel. With the aid of a sliding caliper or some other type of measuring stick it is then simple to measure how far the measuring pin protrudes out from a given measuring plane of the indicator. It is advantageous to specify the limit for worn linings in the operators and repair manuals for the vehicle, making optimum use of the linings possible while main-taining a high level of safety, replacing the linings before they are completely worn down.

The purpose of the present invention is therefore to achieve a wear indicator of the type described by way of introduction in which the disadvantages described above have been removed or been minimized and the effect of the tolerances of the components has been eliminated.

BRIEF DESCRIPTION OF THE DRAWINGS

A preferred embodiment of the invention will be described in more detail below in the following description but only as examples, with the aid of the accompanying schematic drawings.

DESCRIPTION OF THE PREFERRED EMBODIMENTS

Figure 1:
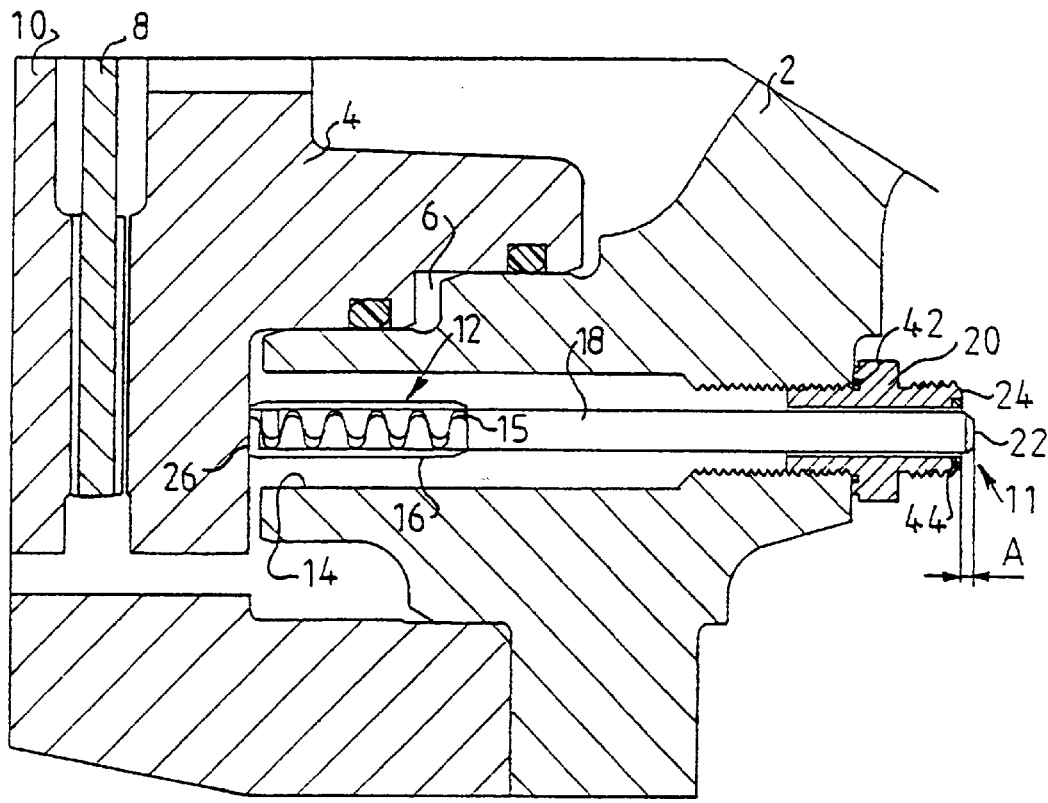
FIG. 1 shows a portion of a fluid cooled friction brake in section with a mounted wear indicator.
Figure 2:
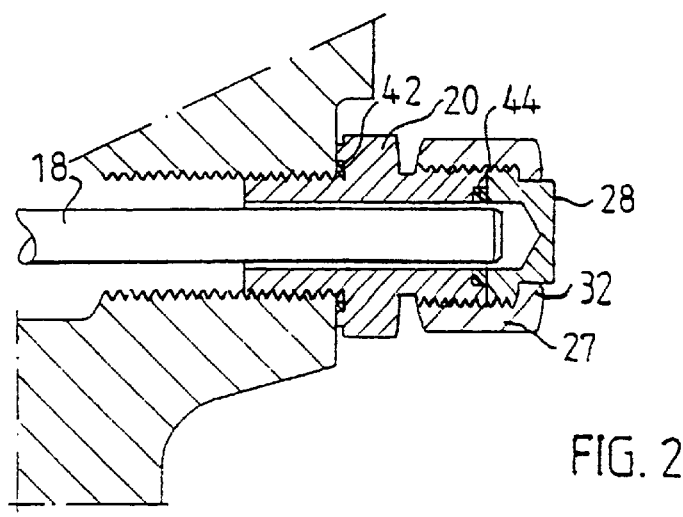
FIG. 2 shows on a larger scale a detail of the indicator with a protective cap mounted.
Figure 3:
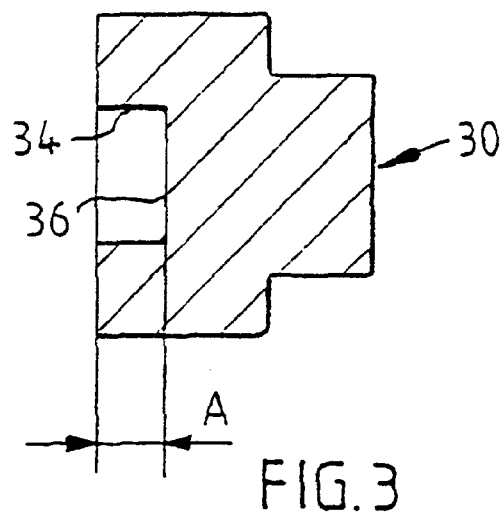
FIGS. 3 and 4 show a calibrating cap and a protective cap, respectively, for the indicator in enlargement.
Figure 4:
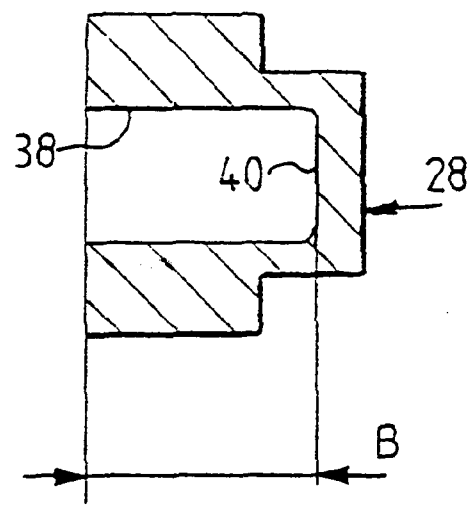

Tractors and motorized implements usually have encapsuled axles and brakes and in a friction brake 1 of such a vehicle, as a rule, the outer end of the axle casing is made as a brake housing 2 in which a brake piston 4 made in one piece with a pressure plate is displaceably mounted. The piston is displaceable using a hydraulic fluid which is enclosed in an annular chamber 6 enclosed between the housing and the piston. A brake disc 8 provided on both sides with friction material is arranged between the brake piston and a counter-surface 10. For reasons of cost, the thickness of the friction material on each side is only circa 2 mm and the brake is of "wet-brake"-type, which means that both the piston 4 and the brake disc 8 as well as the counter-surface 10 are arranged in a bath of oil, which in turn provides more effective cooling and thus reduces the wear on the friction material. Due to the thinness of the friction material the requirements as to precision and reliable indication of its current thickness increase so that the lower wear limit will not be exceeded. In order to assure cooling and a continuously effective braking effect, this limit is set so that the cooling grooves remain, which means at least 0.5 mm of thickness, which means that the wear allowance on a new brake until the friction linings must be replaced, will be a maximum of 1.0 mm per side and thus a total maximum wear allowance per wheel brake of 2 mm.

According to the embodiment shown, this is achieved with a war indicator 11 comprising an easily displaceable adjustable measuring rod 12 which is mounted in a cavity 14 in the brake housing 2, said measuring rod being made in two parts, a tube 16 radially resilient by means of a slot 15 extending along the length of the tube and a pin 18 partially inserted in the tube. The inner diameter is adapted to the outer diameter of the pin in such a manner that the tube is joined to the pin by means of a forced frictional engagement which cannot be overcome without the aid of tools. In the embodiment shown, the slot 15 is toothed (wave-shaped) but other constructions are also possible, for example a straight or helical shape.

On the outside of the brake housing, a threaded nipple 20 is screwed into a corresponding thread in the cavity 14. This nipple has a through-hole which is a guide for the pin 18 of the measuring rod 12, which is inserted into the cavity 14 with the tube 16 facing towards the brake piston 4 and consequently with the free end of the pin 18 extending out of the nipple. The protruding pin end, as is the outer end of the nipple and the free end of the tube, are made with respective measuring planes 22, 24, 26.

The outer end of the nipple is provided with an external thread on which a flange nut 27 can be screwed. A protective cap 28 or in certain cases a calibrating cap 30 can be mounted as an inset abutting against the annular flange 32 of the flange nut so that the nut when screwed on with the protective cap will protect against the penetration of impurities and with the calibration cap 30 it can be used to set the starting value of the indicator 11 when the brake has been provided with new brake linings.

For this purpose, the calibrating cap has a calibration cavity 34, the depth A of which determines the permissible wear thickness of the brake. According to this embodiment, when the calibrating cap is mounted, it will permit the measuring plane 22 of the pin end to protrude 2 mm from the measuring plane 24 of the nipple, when the measuring plane of the pin end is in contact with a bottom 36 of the calibration cavity.

The protective cap 28, on the other hand, has a cavity 38, the bottom 40 of which is located at a depth B which corresponds to at least the sum of the permitted wear (2 mm) and the maximum stroke of the brake piston, which is 1–2 mm.

In order to prevent both penetration of impurities and leakage of transmission oil, a ring seal 42 and 44, respectively, is arranged between the nipple 20 and the outside of the brake housing 2 and between the outer end 24 of the nipple and the protective cap 28.

Instead of the flange nut described with the inset caps, other types of nuts with fixed insets can be used, e.g acorn nuts, as protective caps or calibrating caps with corresponding cavities as described above.

The wear indicator functions in the following manner. The measuring rod 12 is pre-mounted by pushing the pin 18 a certain distance into the tube 16 but only so far so that, after mounting and engaging the brake and after the nipple 20 has been screwed securely into the brake housing 2, the free end of the pin protrudes somewhat further out than what corresponds to the permitted wear on the brake when the measuring plane 26 of the tube is in contact with the brake piston 4.

The flange nut 27 with the calibrating cap 30 is then screwed securely onto the nipple, and the calibrating cap overcomes the frictional engagement between the components and presses the pin 18 into the tube 16 until the calibrating cap finally is in contact with the measuring plane 24 of the nipple. Since the measuring plane 22 of the pin end in this position abuts against the bottom 36 of the calibrating cap, the length of the measuring rod 12 is now exactly adjusted so that the distance A exactly corresponds to the allowable wear thickness. The nut 27 is screwed off and the calibrating cap is replaced with the protective cap 32 and the seal 42, and these parts are brought into sealing abutment against the outer end of the nipple by means of the nut.

Due to the fact that the depth B of the protective cap permits the measuring rod 12 to follow the reciprocating movements of the brake piston without being clamped between the brake piston 4 and the bottom 40 of the protective cap, the set length of the measuring rod is not changed. It is thus very simple to alter check the remaining wear thickness at a work place by removing the protective cap 32, engaging the brake, pressing the measuring rod against the piston and measuring how far the rod protrudes outside the measuring plane of the nipple 20.

With the described wear indicator, it is thus possible, with the aid of a single calibrating cap to precisely calibrate the measuring rods of all the wheel brakes without having to take into account individual variations and tolerances in manufacturing and mounting of the brakes.

Finally, it is also possible to remotely read remaining wear thickness by arranging a compression spring between the nipple 20 and the tube 16 to press the rod against the brake piston and, for example, an electric sensor which continuously senses the protruding length of the rod, and indicate it on an instrument in the operator's cab of the vehicle.

What is claimed is:

1. A wear indicator for friction linings of vehicle brakes that comprise a brake housing with brake means movable relative to the brake housing, a counter-surface solidly anchored to the brake housing, and at least one friction means provided with a friction lining, said friction means being displaceable by means of the brake means between an inactive position and an engaged position pressed against the counter-surface and the brake means, said wear indicator comprising:

a measuring rod in a cavity in the brake housing, said measuring rod being displaceable with one end in contact with the brake means and with the other end protruding outside the brake housing a distance, which is dependent on a distance between the brake means and the counter-surface, said measuring rod having a length defined by said two ends that is adjustable; and a calibrating means setting the adjustable length of said measuring rod to a length in conformance with a wear indication starting value when the friction means are in the engaged position.

2. The wear indicator according to claim 1, wherein a protruding part of said measuring rod corresponds to a maximum permissible wear allowance for new friction linings.

3. The wear indicator according to claim 1, wherein said measuring rod comprises at least a first and a second part, said parts being displaceable to selectable positions relative to each other, in which the parts are forcibly bound to each other.

4. The wear indicator according to claim 3, wherein the first part of said measuring rod is a radially resilient tube and the second part is a pin with an outer diameter fitted to an inner diameter of the tube, and wherein the tube is forced onto the pin and is held thereon by means of frictional engagement created by the resilient force of the tube.

5. The wear indicator according to claim 1, further comprising a cavity in said calibrating cap having a depth which determines the starting value, and wherein the calibrating cap is abutted against a plane of the brake housing.

6. The wear indicator according to claim 5, further comprising a protective cap, which has a further cavity having a depth that is greater than a sum of the depth of the cavity in the calibrating cap and a stroke of the brake means.

7. The wear indicator according to claim 1, wherein the brake means is a brake piston.

8. A wear indicator for a friction lining of a vehicle brake that comprises a brake housing with a brake movable relative to the brake housing, a counter-surface attached to the brake housing, and a friction part with a friction lining, the friction part being displaced by the brake between an inactive position and an engaged position pressed against the counter-surface and the brake, said wear indicator comprising:

a measuring rod in a cavity in the brake housing, said measuring rod having one end in contact with the brake and another end protruding outside the brake housing a first distance that is dependent on a distance between the brake and the counter-surface, said measuring rod having an adjustable length defined by the two ends and comprising a first part and a second part that is attached to the first and displaceable relative to the first part; and a calibrator that sets the adjustable length of said measuring rod to a length in conformance with a wear indication starting value when the friction plate is in the engaged position, wherein said calibrator is a cap that bears against said another end of the measuring rod and displaces the first and second parts relative to each other.

9. A wear indicator for a friction lining of a vehicle brake that comprises a brake housing with a brake movable relative to the brake housing, a counter-surface attached to the brake housing, and a friction part with a friction lining, the friction part being displaced by the brake between an inactive position and an engaged position pressed against the counter-surface and the brake, said wear indicator comprising:

a measuring rod in a cavity in the brake housing, said measuring rod having one end in contact with the brake and another end protruding outside the brake housing a first distance that is dependent on a distance between the brake and the counter-surface, said measuring rod having an adjustable length defined by the two ends; and a calibrating cap that bears against said another end of said measuring rod to set the adjustable length of said measuring rod to a length in conformance with a wear indication starting value when the friction plate is in the engaged position.

10. The wear indicator according to claim 9, wherein said calibrating cap comprises a cavity whose depth defines the wear indication starting value.

\* \* \* \* \*